(12) United States Patent
Fukushima (10) Patent No.: US 7,548,326 B2
(45) Date of Patent: Jun. 16, 2009

(54) METHOD OF ADJUSTING IMAGE RECORDING APPARATUS FOR CORRECTING SKEW

(75) Inventor: Kimitake Fukushima, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 873 days.

(21) Appl. No.: 11/085,017

(22) Filed: Mar. 21, 2005

(65) Prior Publication Data

US 2005/0207740 A1    Sep. 22, 2005

(30) Foreign Application Priority Data

Mar. 22, 2004   (JP) .............................. 2004-083379

(51) Int. Cl.
  *G06K 15/00*   (2006.01)
(52) U.S. Cl. .................. 358/1.12; 347/19; 347/116; 347/262; 358/504; 399/15; 399/72; 399/394; 399/395; 702/150
(58) Field of Classification Search ............... 358/1.12; 400/579; 382/294
See application file for complete search history.

(56) References Cited

U.S. PATENT DOCUMENTS

| | | | | |
|---|---|---|---|---|
| 4,511,242 A | * | 4/1985 | Ashbee et al. .............. 399/395 |
| 4,763,889 A | * | 8/1988 | Dei et al. .................... 271/9.03 |
| 5,683,078 A | * | 11/1997 | Schieck ....................... 271/250 |
| 6,118,950 A | * | 9/2000 | Wibbels et al. ............... 399/16 |
| 6,490,421 B2 | * | 12/2002 | McIntyre ..................... 399/15 |
| 2002/0136579 A1 | * | 9/2002 | Michel et al. ................. 400/74 |
| 2003/0122887 A1 | * | 7/2003 | Bland .......................... 347/19 |
| 2003/0133000 A1 | * | 7/2003 | Conrow et al. .............. 347/116 |

FOREIGN PATENT DOCUMENTS

JP    2003-292198 A    10/2003

\* cited by examiner

*Primary Examiner*—King Y Poon
*Assistant Examiner*—David S Cammack
(74) *Attorney, Agent, or Firm*—Sughrue Mion, PLLC (57) ABSTRACT

A printer processor prints out two sheets of test prints by printing a test pattern on two recording sheets of different lengths. The test pattern consists of eight straight-linear lines that are parallel to a main scan direction or a sub scan direction of an exposure section. Dimensions of designated portions of the test pattern are measured on each of the test prints, to detect skew characteristics of the recording sheets, deviations of print starting positions in the main and sub scan directions and fluctuations in transport speed of the recording sheets. Based on the detected values, a skew correcting section, the exposure section and a conveyer device for the recording sheets are controlled to correct skew of the recording sheets, the print starting positions in the main and sub scan directions and the transport speed.

12 Claims, 7 Drawing Sheets

METHOD OF ADJUSTING IMAGE RECORDING APPARATUS FOR CORRECTING SKEW

FIELD OF THE INVENTION

The present invention relates to a method of adjusting an image recording apparatus, to correct skew of a recording material relative to a main scan direction before the image recording device records an image on the recording material conveyed along a paper path.

BACKGROUND ART

As the image recording apparatus, a photo printer is known, which records an image on a photosensitive recording material or called photographic paper by exposing it to light obtained from an image photographed on negative film. As for such photo printers, the mainstream was a direct exposure style that exposes the photosensitive recording material to an optical image projected from the negative film onto the photosensitive material. However, digital photo printers have been put into practical use, which capture the image on the negative film as image data by photoelectric conversion, perform various image processing to the image data and exposes the photosensitive material to recording light modulated according to the image.

Most of the digital photo printers cut a long web of photosensitive material into a given length according to the designated size of photo prints, and expose the cut sheet of photosensitive material to record the image. If, however, a leading edge of the photosensitive material is on the skew relative to a main scan direction of an exposure section or an image recording device when exposing the cut sheet of photosensitive material to record the image, the image is recorded on the skew. For this reason, it is necessary to correct the skew of the photosensitive material and supply the photosensitive material to the exposure section in an appropriate position with no skew.

In order to solve such problem, the skew of the photosensitive material is conventionally corrected before supplying the cut sheets of photosensitive material to the exposure section. For example, a sheet conveyer device with a skew correcting device is known from Japanese Laid-open Patent Application No. 2003-292198. The skew correction device consists of a roller pair whose one end is a bearing section and whose other end is movable up and down in a direction perpendicular to the paper path. The sheet conveyer device corrects the skew of the photosensitive material by moving one end of the roller pair so as to provide a difference in length of the paper path between opposite ends of the paper path in a widthwise direction of the paper path, that is equivalent to the main scan direction.

In order to detect the skew of the photosensitive material, the sheet conveyer device described in the above-mentioned prior art apposes two detecting sensors along the widthwise direction of the paper path to detect each leading edge of the photosensitive material. Based on which of these two sensors detects the leading edge first and how much the difference in detection time between the two sensors, the direction and angle of inclination of the leading edges relative to the main scan direction, hereinafter collectively referred to as the skew of the leading edge, is determined. However, according to this prior art, a minute change in transport speed or a deviation in mounting position of the detecting sensors will cause a detection error, so it is difficult to accurately detect the skew based on the outputs of these detecting sensors. Moreover, because the skew correcting device itself involves some tolerance as a unit, it is impossible to feedback-control the tolerance of the skew correcting device based on the outputs of the detecting sensors. For this reason, it has been hard to correct the skew of the photosensitive material with high accuracy enough to obtain high quality photo prints.

SUMMARY OF THE INVENTION

In view of the foregoing problems, an object of the present invention is to provide a method of adjusting an image recording apparatus, whereby the skew of the recording material is corrected with high accuracy.

To achieve the above and other objects, the present invention provides a method of adjusting an image recording apparatus that comprises a recording material supply section for supplying sheets of recording material, a conveyer device for conveying the recording material along a transport path, a recording device for recording an image on the recording material as being conveyed, and a skew correction device for correcting skew of the recording material on the transport path so as to make a leading edge of each sheet of the recording material be parallel to a main scan direction that is a widthwise direction of the transport path, the method comprising steps of supplying first and second sheets of recording material from the recording material supplying section, the first and second sheets being different in length in a sub scan direction that is a lengthwise direction of the transport path; recording a test pattern on the first and second sheets of recording material by the recording device, to produce first and second test prints, the test pattern having a first line that is defined to be parallel to the sub scan direction; measuring distances from one side of each of the test prints to two different points of the first line as recorded on each of the test prints; calculating a skew degree of each of the first and second test prints from the measured two distances; calculating skew characteristics of each of the first and second sheets of recording material from the skew degrees of the first and second test prints, the skew characteristics being dependent upon a location of the recording material supply section and the lengths in the sub scan direction of the first and second sheets; and adjusting, based on the calculated skew characteristics, correction parameters for the skew correction device to correct skew of recording materials supplied from the recording material supply section.

According to a preferred embodiment, the image recording apparatus comprises a second recording material supply section, and the method further comprises steps of supplying a third sheet of recording material from the second recording material supplying section, the third sheet being equal in length in the sub scan direction to the first sheet; recording a test pattern on the third sheet, to produce a third test print; measuring distances from one side of the third test print to two different points of the first line as recorded on the third test print; calculating a skew degree of the third test print from the measured two distances; calculating skew characteristics of the third sheet of recording material from the skew degrees of the first and third test prints, the skew characteristics being dependent upon a location of the second recording material supply section and the length in the sub scan direction of the third sheet; and adjusting, based on the calculated skew characteristics of the third sheet, correction parameters for the skew correction device to correct skew of recording materials as supplied from the second recording material supply section.

The test pattern preferably comprises a second line that is defined to be parallel to the main scan direction, and the method further comprises steps of calculating a variation of a print starting position in the sub scan direction based on a distance from a leading end to the second line of either of the test prints; and adjusting the print starting position in the sub scan direction by controlling the recording device based on the calculated variation of the print starting position in the sub scan direction.

More preferably, the test pattern comprises a plural number of second lines defined to be parallel to the main scan direction, and a third line that is symmetrical to the first line about a referential line connecting center points of the second lines to each other, and the method further comprises steps of calculating a variation of a print starting position in the main scan direction based on a difference between a distance from the one side edge to the first line and a distance from opposite side edge to the third line with respect to either of the test prints; and adjusting the print starting position in the main scan direction by controlling the recording device based on the calculated variation of the print starting position in the main scan direction.

It is preferable that the test pattern comprises at least two second lines defined to be parallel to the main scan direction and spaced apart from each other at a predetermined distance, and the method further comprises steps of measuring a distance between the second lines on either of the test prints to calculate a fluctuation in transport speed of the recording material, and controlling the conveyer device to adjust the transport speed based on the calculated fluctuation in transport speed. It is also preferable to prove information identifying the test prints on a front side or a back side of each of the test prints. According to a preferred embodiment, the recording material supply section is loaded with one of different kinds of exchangeable recording material containers, and the method further comprises steps of making a test print with respect to each of the recording material containers, to adjust the correction parameters for the skew correction device, the print starting positions in the main and sub scan directions and the transport speed of the conveyer device individually on each of the recording material containers.

According to still another embodiment, the image recording apparatus comprises a display device, and the method comprises steps of displaying a selected one of setting screens on the display device, the setting screens comprising one for allowing adjusting the correction parameters for the skew correction device, the transport speed of the conveyer device and the print starting positions in the main and sub scan directions simultaneously with respect to all of the recording material containers, and ones for allowing adjusting any of the correction parameters for the skew correction device, the transport speed of the conveyer device, the print starting position in the main scan direction or the print starting position in the sub scan direction with respect to individual one of the recording material containers.

The inventive method of adjusting the image recording apparatus calculates skew characteristics of each type of recording material based on a test print that is printed on the recording material, wherein the skew characteristics depend on where the recording material supply section for that recording material is placed in the image recording apparatus as well as the length of each recording material. Thereby the skew of the recording material is detected with accuracy, so the correction parameters for the skew correcting device may be corrected with accuracy. Thus the present invention makes sure to produce excellent prints free from image skew or distortion.

A deviation caused by the set position of magazine as well as a deviation dependent on the length in the sub scan direction of the photosensitive material are detectable based on the two test prints of different length from a single magazine. Since the deviation dependent on the length in the sub scan direction of the photosensitive material does not depend on the magazine set positions, it is possible to detect the deviation caused by the set positions of other magazines by making a test print from each of other magazines. In other words, the skew characteristics of the photosensitive material can be detected from such a minimum number of test prints.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DETAILED DESCRIPTION OF THE PREFERRED EMBODIMENTS

Figure 1:
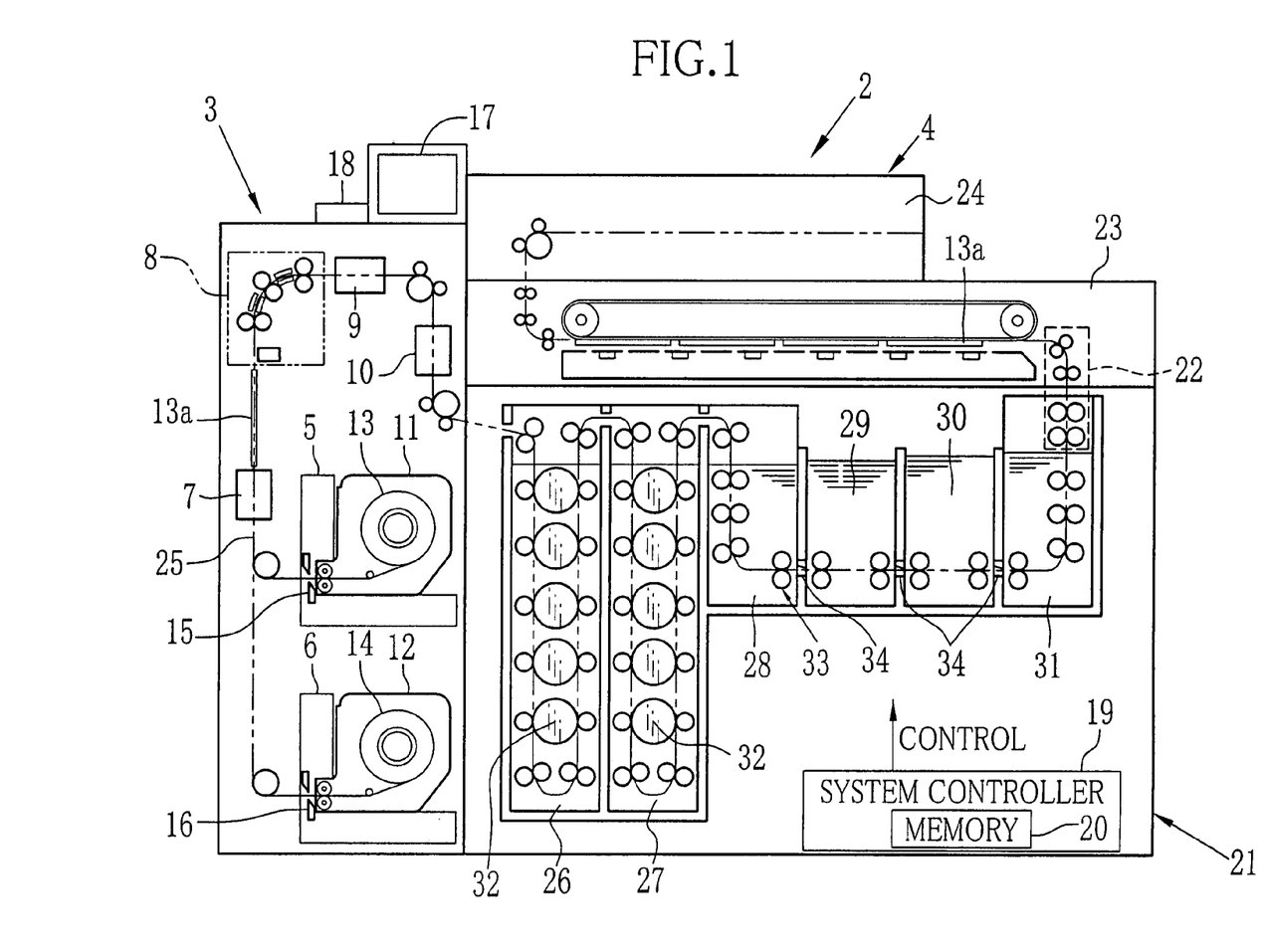
FIG. 1 is a schematic view illustrating the interior of a printer processor.

In FIG. 1, a printer processor 2 has a printer section 3 and a processor section 4. The printer section 3 consists of two magazine decks 5 and 6, a back-printing section 7, a skew correcting section 8, an exposure section 9 and a distribution section 10. The magazine decks 5 and 6 are for positioning magazines 11 and 12, each of which supplies a photosensitive material as a recording material. The magazine deck 5 is arranged above the magazine deck 6, and the magazine 11 placed on the magazine deck 5 stores a rolled web of photosensitive material 13 of 89.0-mm width. The magazine 12 placed on the magazine deck 6 stores a rolled web of photosensitive material 14 of 305.0-mm width. The photosensitive materials 13 and 14 are respectively pulled out from the magazines 11 and 12 and cut by cutters 15 and 16 in the magazine decks 5 and 6 into a given length according to a size of photo prints.

Above the printer section 3, a monitor 17 and a console 18 are provided. The monitor 17 is a displaying device which displays various kinds of setting screens, and the console 18 is an operating device which an operator manipulates in inputting various setting values and having the printer processor 2 execute various processing. The monitor 17 and the console 18 are connected to a system controller 19 installed in the processor section 4. Connected to respective sections in the printer processor 2, the system controller 19 is a controlling device which controls the whole printer processor 2, and the system controller 19 contains an internal memory 20 which stores the various setting values. The memory 20 is a rewritable memory such as EEPROM.

The following explanation will relates to a case where the photosensitive material 13 is pulled out from the magazine 11. After being pulling out from the magazine 11, the photosensitive material 13 is cut by the cutter 15 into a cut sheet of photosensitive material or called a photosensitive sheet 13a of a given length according to the size of photo prints. The photosensitive sheet 13a is conveyed along a paper path shown in a phantom line in the drawing, and is printed with a frame serial number, correction data and others at the backprinting section 7. Then the photosensitive sheet 13a is conveyed to the skew correcting section 8.

The skew correcting section 8 is a skew correcting device which corrects inclination of the photosensitive sheet 13a relative to a main scan direction of the exposure section 9, that is orthogonal to a transport direction of the photosensitive sheet. Hereinafter, the inclination relative to the main scan direction will be referred to as the skew. In other words, the skew correcting section 8 corrects the skew of the photosensitive sheet 13a so that a leading edge of the photosensitive sheet 13a becomes parallel to the main scan direction of the exposure section 9. After the photosensitive sheet 13a is conveyed to the exposure section 9 where an image is recorded on a photosensitive surface of the photosensitive sheet 13a in the form of a latent image by scanning-exposure based on image data. The photosensitive sheet 13a is then distributed to either single line or plural lines according to the size and number of photo prints by the distribution section 10 and conveyed to the processor section 4.

The processor section 4 consists of a developing section 21, a squeezing section 22, a dry section 23 and a sorter section 24. The developing section 21 is provided with a developing tank 26, a bleach fix tank 27 and the first to fourth wash tanks 28, 29, 30 and 31 in this order from the upstream of the transport direction (from the left in the drawing) of the photosensitive sheet 13a. The developing tank 26, the bleach fix tank 27 and the first to fourth wash tanks 28 to 31 store given amounts of developing solution, bleach-fix bath and wash water respectively. Inside the developing tank 26 and bleach fix tank 27, there are conveyer racks 32 which consist of plural conveyer rollers conveying the photosensitive sheet 13a along an almost U-shaped path in both tanks. In the wash tanks 28 to 31, there are many conveyer roller pairs 33 conveying the photosensitive sheet 13a. The latent images recorded on the photosensitive sheet 13a are developed during being conveyed from the tank 26 to the tank 31 by the conveyer racks 32 and the conveyer roller pairs 33.

Among the wash tanks 28 to 31, the photosensitive sheet 13a is sent to the next tank through a submerged squeezing portion 34 in a partition wall. The submerged squeezing portion 34 has a blade made from a resilient laminate that allows pass of the photosensitive sheet 13a but prevents outflow of the wash water. The developed photosensitive sheet 13a is removed water from its surfaces at the squeezing section 22 and then sent to the dry section 23. The dry section 23 dries the photosensitive sheet 13a by blowing heated dry air on it and then sends it to the sorter section 24. The sorter section 24 distributes and stocks the photosensitive sheets 13a by one order to another.

In the above explanation, processing such as image recording and developing are carried out on the photosensitive sheet 13a after pulling the photosensitive material 13 from the magazine 11. The same applies to a case where the photosensitive material 14 is pulled out from the magazine 12, so the details of the latter case will be omitted to avoid redundancy.

Figure 2:
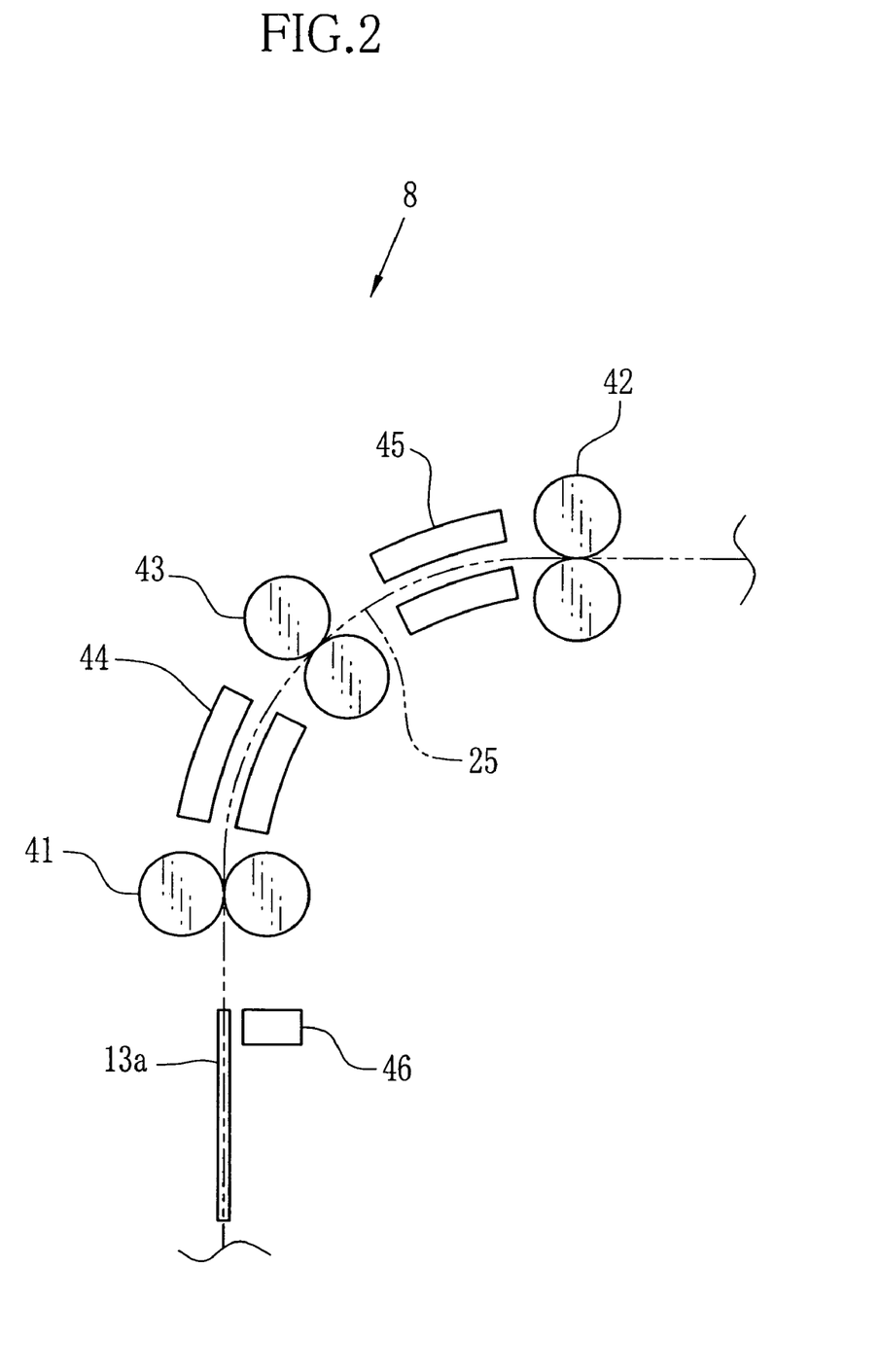
FIG. 2 is a schematic view illustrating the interior of a skew correcting section.

Next, the interior of the above-mentioned skew correcting section 8 will be explained. The skew correcting section 8 is, as mentioned before, to correct the skew of the photosensitive sheet 13a so that the leading edge of the photosensitive sheet 13a becomes parallel to the main scan direction of the exposure section 9. The skew correcting section 8, as shown in FIG. 2, consists of conveyer roller pairs 41 and 42, a skew correcting roller pair 43 and transport guides 44 and 45, and all of them are disposed parallel to the main scan direction of the exposure section 9. In addition, the skew correcting roller pair 43 and the transport guides 44 and 45 are arranged so as to form a curved paper path between the conveyer roller pairs 41 and 42. In other words, these members form an arc-shaped transport path 25 to bend the transport direction of the photosensitive sheet 13a to ninety degrees, disposed in the order of the conveyer roller pair 41, the transport guide 44, the skew correcting roller pair 43, the transport guide 45 and the conveyer roller pair 42. In addition, at the beginning of the skew correcting section 8, a detecting sensor is disposed to detect the leading edge of the photosensitive sheet 13a.

Figure 3:
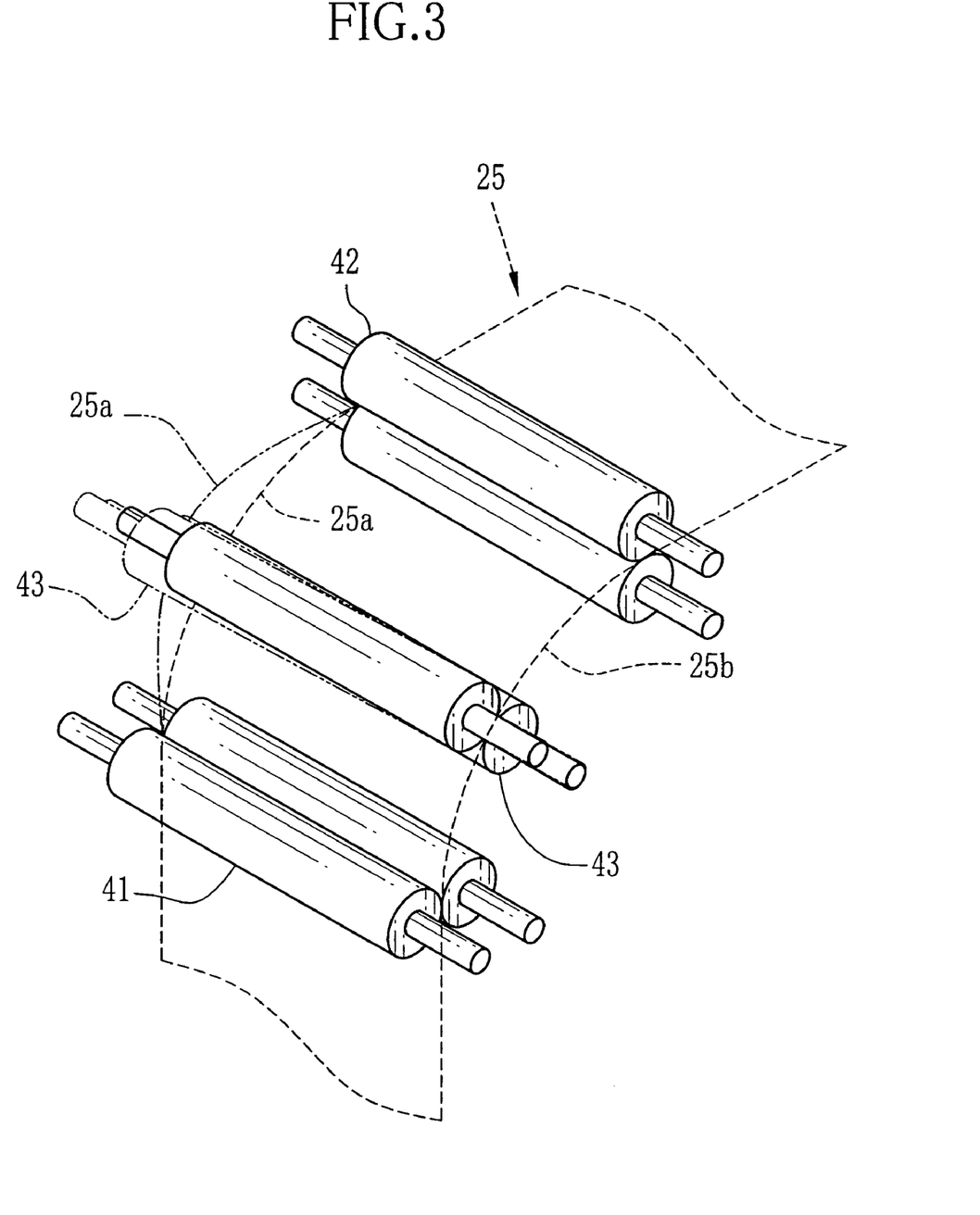
FIG. 3 is a schematic view illustrating a shift movement of a skew correcting roller pair.

The skew correcting roller pair 43 is arranged in the center of the arc-shaped transport path 25. Though the skew correcting roller pair 43 is the same roller pair as the conveyer roller pairs 41 and 42, one end is a pivot point and the other end is movable up and down in a direction perpendicular to the transport path 25 and its inclination or tilt is adjustable. For example, as shown in FIG. 3, the skew correcting roller pair 43 is parallel to the main scan direction of the exposure section 9 and moves from a reference position shown by a solid line to a position shown by a phantom line in the drawing. With this movement, a left end 25a of the transport path 25 also moves from the position shown by the solid line to the position shown by the phantom line in the drawing, while a right end 25b of the transport path 25 does not change its position, thereby providing a difference in length between the left end 25a and the right end 25b of the transport path 25.

The transport guides 44 and 45 are a guide member made from a pair of guide plates and placed facing the transport path 25, and are respectively arranged before and behind the skew correcting roller pair 43. Like the skew correcting roller pair 43, the transport guides 44 and 45 can also change their tilt to their reference positions by moving their left ends while being pivotally supported at their right ends. But it is possible to move only the skew correcting roller pair 43, without making the transport guides 44 and 45 movable.

As described above, a change in angle of the skew correcting roller pair 43 and the transport guides 44 and 45 to their reference positions provides a difference in length of the transport path 25 between the left end 25a and the right end 25b of the transport path 25 at the skew correcting section 8, i.e. between opposite ends in the widthwise direction of the transport path 25, that is equal to the main scan direction of the exposure section 9. The difference in length of the transport path 25 between the left and right ends 25a and 25b results in changing the inclination of the leading edge of the photosensitive material to the main scan direction. Therefore, it is possible to correct the skew of the photosensitive material by controlling the tilt of the skew correcting roller pair 43. As described above, in order to change the tilt of the skew correcting roller pair 43 and the transport guides 44 and 45, it is merely necessary to make their one ends or end areas in the main scan direction pivotal, and to move their other ends up or down. For this purpose, it is possible to use any known device, so such a device is omitted from the drawings. For example, an actuator such as an air cylinder is engaged with holding members that hold bearings of two roller shafts of the skew correcting roller pair 43 and the ends of the transport guides 44 and 45 respectively, to lift the respective holding members by the force of the actuator. In that case, the system controller 19 controls the actuator to adjust the tilt of the skew correcting roller pair 43 and the transport guides 44 and 45 so as to correct the skew of the photosensitive sheet 13a.

The printer processor 2 makes test-printing to record a predetermined test pattern on the photosensitive material. Based on measured values from predetermined sections in the test print, the printer processor 2 corrects the above-mentioned skew of the photosensitive material, and adjusts sub scanning speed that is transport speed of the photosensitive material, image position in the main scan direction, and print starting position in the manner as set forth below.

Figure 4:
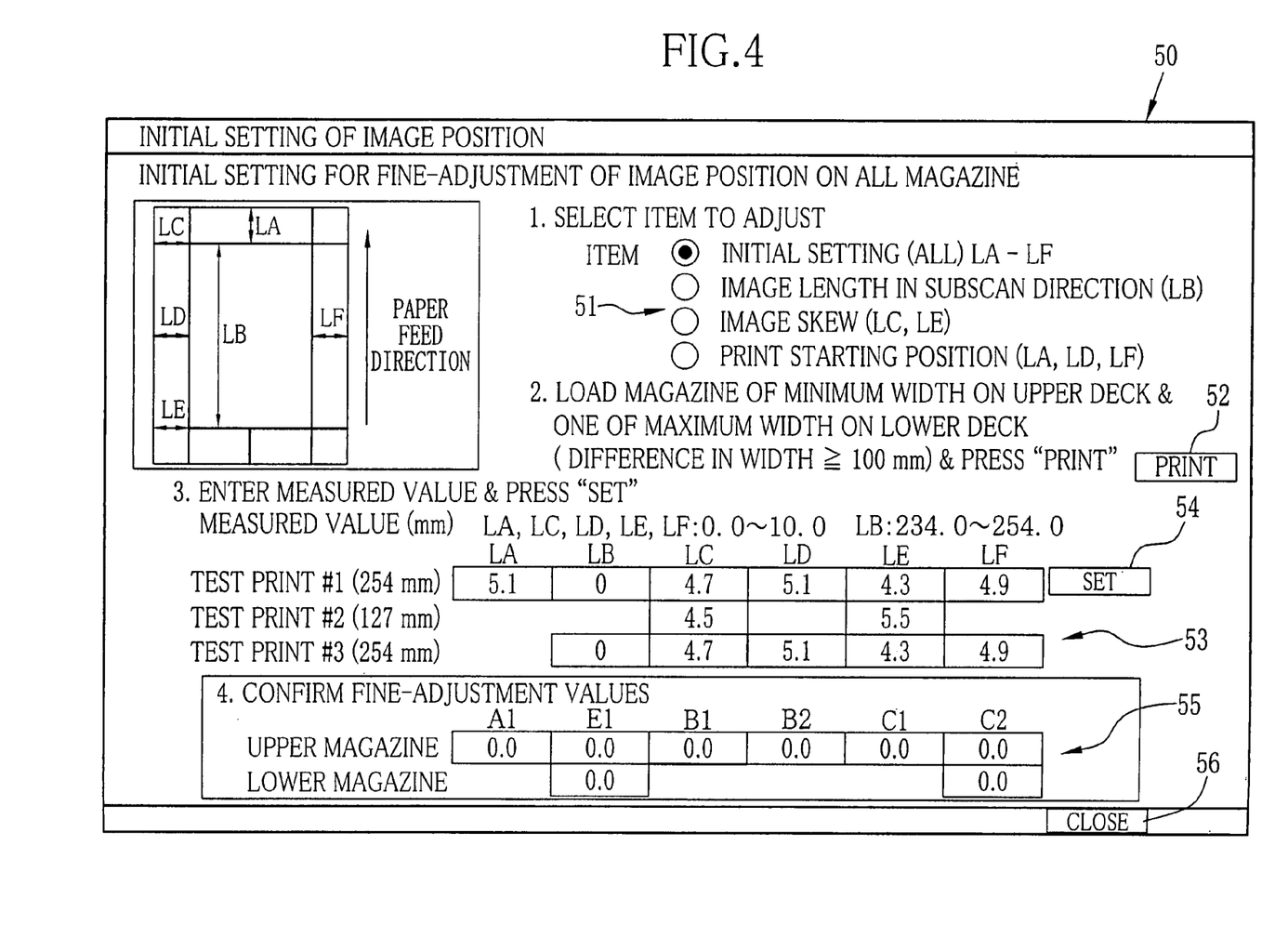
FIG. 4 is an explanatory diagram illustrating an initial setting screen.

First, an operator manipulates the console 18 to display an initial setting screen 50 on the monitor 17 as shown in FIG. 4. While looking at the initial setting screen 50 displayed on the monitor 17, the operator follows indications on the screen 50 for the initial setting by the console 18.

The first thing is to select an "Item" to adjust. There are four items including "Initial Setting (All)," "Image Length In Sub Scan Direction," "Image Skew" and "Print Starting Position." On the left side of the four items, a check field 51 consisting of four check boxes is displayed corresponding to the respective items. For example, when the operators want to execute "Initial Setting (All)," they check the box corresponding to the "Initial Setting (All)" by operating the console 18.

After the operator confirms that the magazine deck 5 is loaded with the magazine 11 which stores the photosensitive material 13 of a minimum width e.g. 89 mm and that the magazine deck 6 is loaded with the magazine 12 which stores the photosensitive material 14 of a maximum width e.g. 305 mm, they press a print button 52 by operating the console 18. When the print button 52 is pressed, the system controller 19 receives an order of test print.

It is known that the skew of the photosensitive material is resulted from deviation caused by a set position of magazine and deviation dependent on the length in the sub scan direction of the photosensitive material. Even while there are a plural number of magazine set positions, the deviation dependent on the length in the sub scan direction of the photosensitive material does not depend on the magazine set positions. Therefore, with two test prints of different length from a single magazine, it is possible to detect the deviation caused by the set position of magazine and the deviation dependent on the length in the sub scan direction of the photosensitive material as well. For this reason, it is possible to detect the deviation caused by the set positions of other magazines by making a test print from each of other magazines. In other words, the number of the magazine set positions plus one is enough for the number of test prints. The skew characteristics of the photosensitive material can be detected from such a minimum number of test prints. In the present embodiment, there are two magazine set positions provided by the magazine decks 5 and 6, so three test prints are made to detect the skew characteristics of the photosensitive material.

Figure 5:
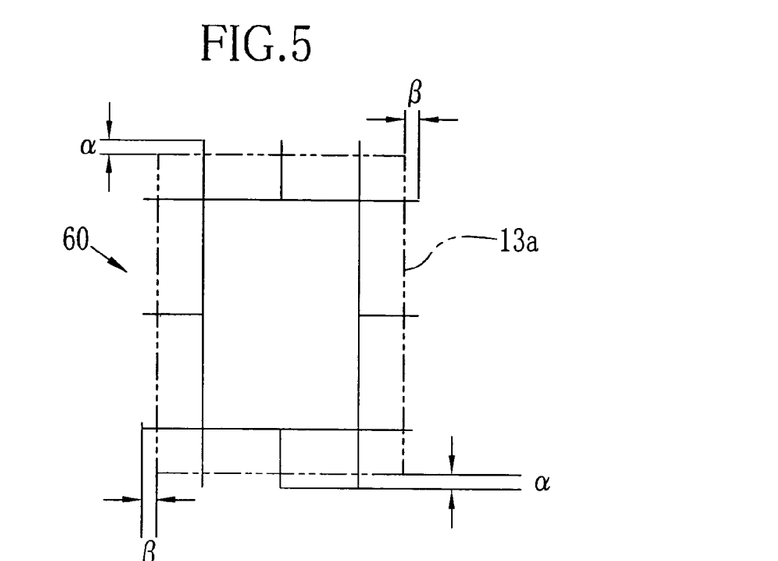
FIG. 5 is an explanatory diagram illustrating a test pattern.

The system controller 19 carries out three test prints: a test print #1 and a test print #2, which are fed respectively by 254 mm and 127 mm from the magazine 11, and a test print #3 fed by 254 mm from the magazine 12. A test pattern 60 consisting of plural lines, as shown for example in FIG. 5, is recorded on these test prints #1, #2 and #3. The plural lines forming the test pattern 60 have lengths to extend a given length a respectively from the leading and trailing ends of a cut sheet of photosensitive material, e.g. a photosensitive sheet 13a, and a given length B respectively from the left and right ends of the photosensitive sheet 13a. As a result, even if the photosensitive sheet 13a has some skew or deviation, the test pattern 60 never fails to be recorded on the photosensitive sheet 13a and output as a test print after being developed and dried at the processor section 4.

Figure 6:
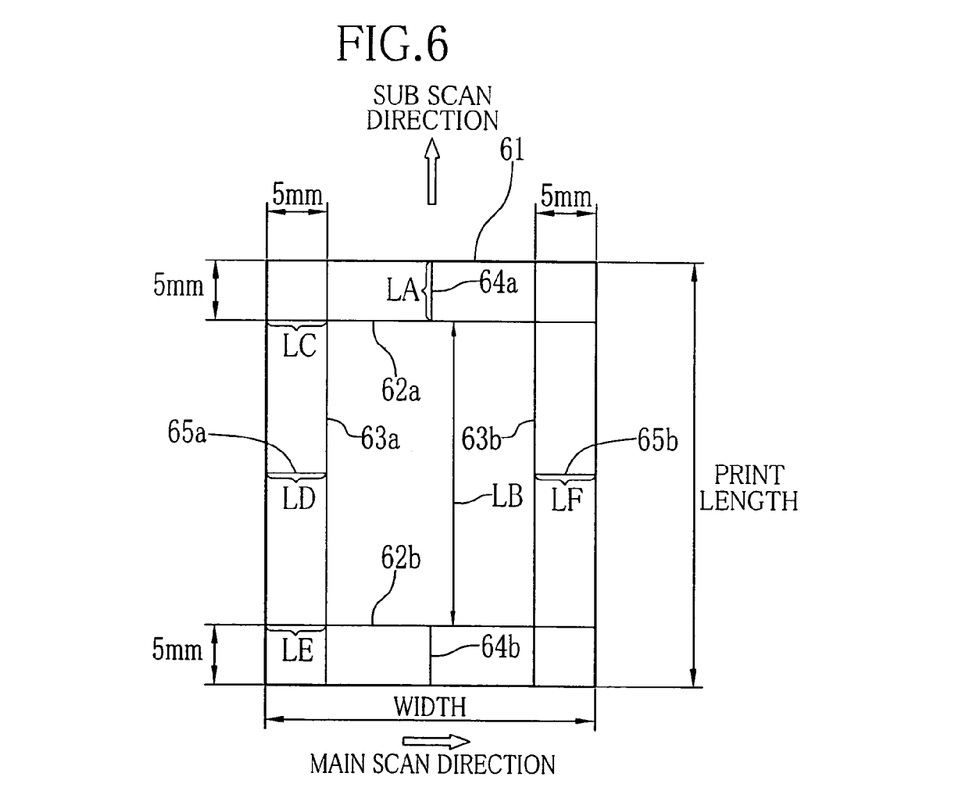
FIG. 6 is an explanatory diagram illustrating a test print.

As shown in FIG. 6, a plural number of lines 62a, 62b, 63a, 63b, 64a, 64b, 65a and 65b are recorded on a test print 61 made from the test pattern 60. The lines 62a and 62b extend from a left edge to a right edge of the test print 61, principally in parallel to the main scan direction of the exposure section 9, respectively about five mm away from a leading edge and a trailing edge of the test print 61. The lines 63a and 63b extend from the leading edge to the trailing edge of the test print 61, principally in parallel to the sub scan direction of the exposure section 9, respectively about five mm away from the left and right edges of the test print 61.

The line 64a is a perpendicular bisector of the line 62a, extending from the line 62a to the leading edge of the test print 61. The line 64b is a perpendicular bisector of the line 62b, extending from the line 62b to the trailing edge of the test print 61. The line 65a is a perpendicular bisector of the line 63a, extending from the line 63a to the left edge of the test print 61. The line 65b is a perpendicular bisector of the line 63b, extending from the line 63b to the right edge of the test print 61.

The positions of these lines can slightly change on the test print 61 because of the skew of the photosensitive material and the tolerance that the exposure section 9 itself has as an assembled unit. Therefore, measuring dimensions of the predetermined sections of the test print 61 makes it possible to detect the skew of the photosensitive material, the deviation of recording position of an image and an error of image length.

Before the test pattern 60 is recorded at the exposure section 9, identification information is printed by the back-printing section 7 on the backside of each of the test prints #1 to #3. Identification information include print type, paper feed length, date of printing, a magazine identification number and a magazine position, that is, whether it is an upper position defined by the upper magazine deck 5 or a lower position defined by the lower magazine deck 6. This back printing facilitates to identifying three test prints #1 to #3. Instead of printing on the backside, it is possible to print the identification information on the front side.

For printing the test prints #1 to #3, the positions they are cut by the cutters 15 and 16 are used as respective reference positions. The test-printing is done with default or initial fine-adjustment values without reflecting current fine-adjustment values or correction values. When only one magazine is loaded on any of the two magazine decks 5 and 6, the printing is done on the photosensitive material fed out of that magazine. In other words, when the magazine 11 alone is loaded on the upper deck 5, just the test prints #1 and #2 are printed. On the other hand, when the magazine 12 alone is loaded on the lower deck 6, just the test print #3 is printed. The test prints #1 to #3 go through photographic processing such as image-recording and developing at the printer section 3 and the processor section 4 in the same way as usual.

The operator measures the dimensions of several sections in the individual test prints #1 to #3, using a measuring device. In the example shown in FIG. 6, six sections are measured, including an overall length LA of the line 64a, a distance LB between the lines 62a and 62b, distances LC, LD and LE between the line 63a and the left edge of the test print 61, and the overall length LF of the line 65b. More specifically, LC is the distance between the line 63a and the left edge of the test print 61 on the line 62a. LD is the overall length of the line 65a. LE is the distance between the line 63a and the left edge of the test print 61 on the line 62b.

Thereafter the operator inputs the measured values of the respective sections LA, LB, LC, LD, LE and LF into entry fields 53 by operating the console 18. Next, a method of calculating respective fine-adjustment values i.e. correction values based on the measured values LA to LF will be explained. After inputting the measured values LA to LF, the operator presses a set button 54 by operating the console 18. The system controller 19 accepts the respective measured values LA to LF and stores them in the memory 20. The system controller 19 then calculates the respective fine-adjustment values i.e. the correction values based on the measured values LA to LF as follows.

In order to adjust the print starting position in the sub scan direction, the system controller 19 calculates a fine-adjustment value with respect to one of the three test prints #1 to #3, e.g. the test print #1. The value A1 is a correction value to correct the deviation in the sub scan direction of the image to record, and is calculated according to an equation: A1=5.0 mm−the measured value LA. In order to adjust the print starting position in the main scan direction, the system controller 19 also calculates a fine-adjustment value E1 with respect to the test prints of different width #1 and #3. The value E1 is a correction value to correct the deviation of the image to record in the main scan direction, and is calculated according to an equation: E1=(the measured value LF−the measured value LD)/2.

In order to adjust the sub scanning speed, the system controller 19 calculates characteristics of minute fluctuation in the sub scanning speed by calculating a difference between a measured image length LB and a proper image length, e.g. 244 mm, with respect to the test prints of different width #1 and #3, and then calculates fine-adjustment values B1 and B2 that are correction values to adjust the sub scanning speed. In order to correct the skew of the photosensitive material, the system controller 19 calculates an inclination angle as a skew degree from a difference between the measured values LC and LD, and calculates fine-adjustment values C1 and C2 as correction parameters necessary to correct the skew (fine-adjustment values for tilt positions) with respect to the three test prints #1 to #3. The above-mentioned skew degree is the skew characteristics of the recording material that depend on the magazine position and the length of the photosensitive material.

The system controller 19 also displays the respective fine-adjustment values in a confirmation field 55 for the fine-adjustment values, and stores them as the initial values in the memory 20. After that, when the operator presses "Close" button 56 in the initial setting screen 50, the display of the initial setting screen 50 is closed, completing the processing of initial setting.

The above description about the processing of initial setting relates to the case where the selected item is "Initial Setting (All)". When any other item is selected among "Image Length In Sub Scan Direction," "Image Skew" and "Print Starting Position", it is possible to set only the fine-adjustment values for the selected item by entering only the measured values corresponding to the selected item.

Figure 7:
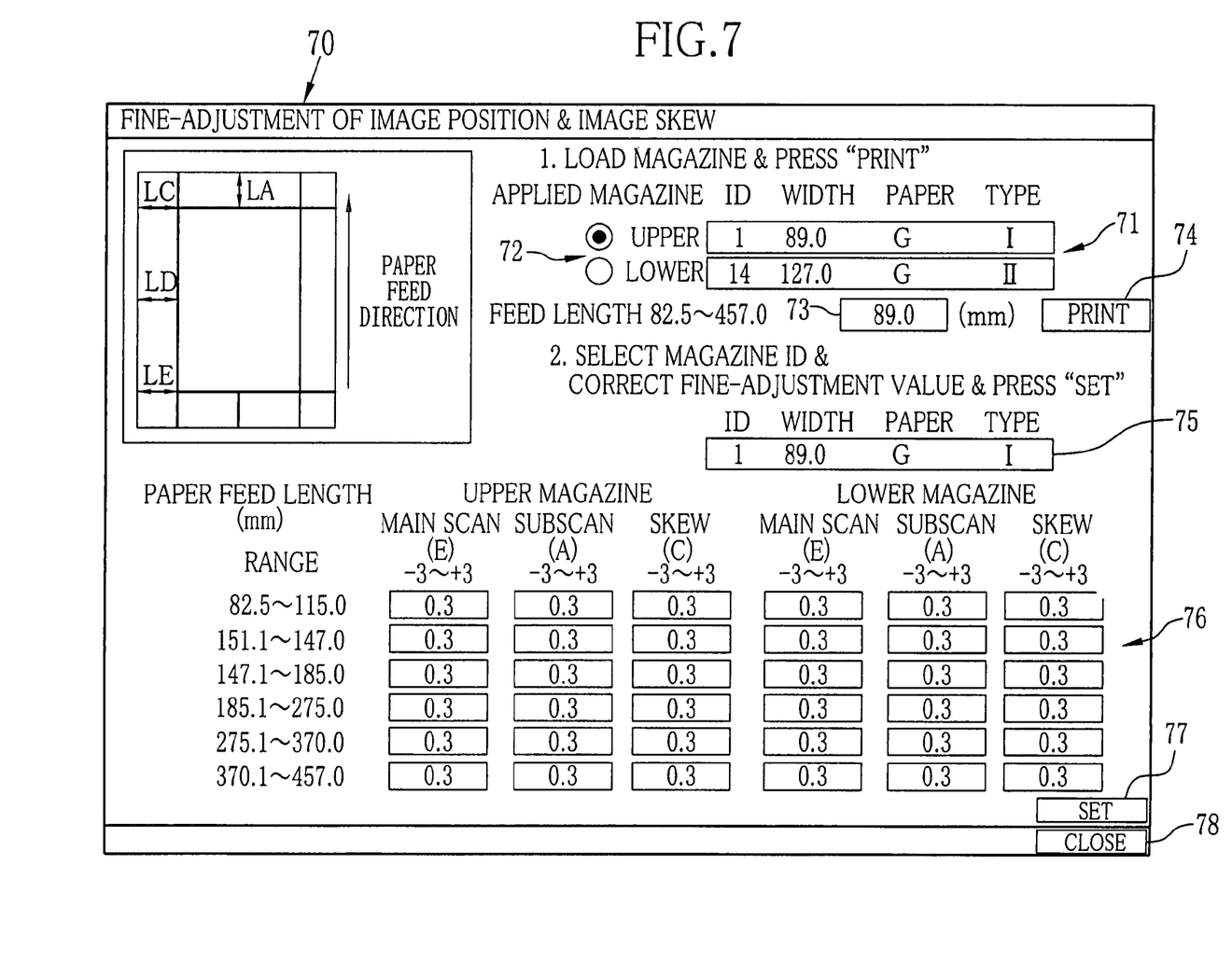
FIG. 7 is an explanatory diagram illustrating a setting screen for fine-adjustment of image position and image skew.
Figure 8:
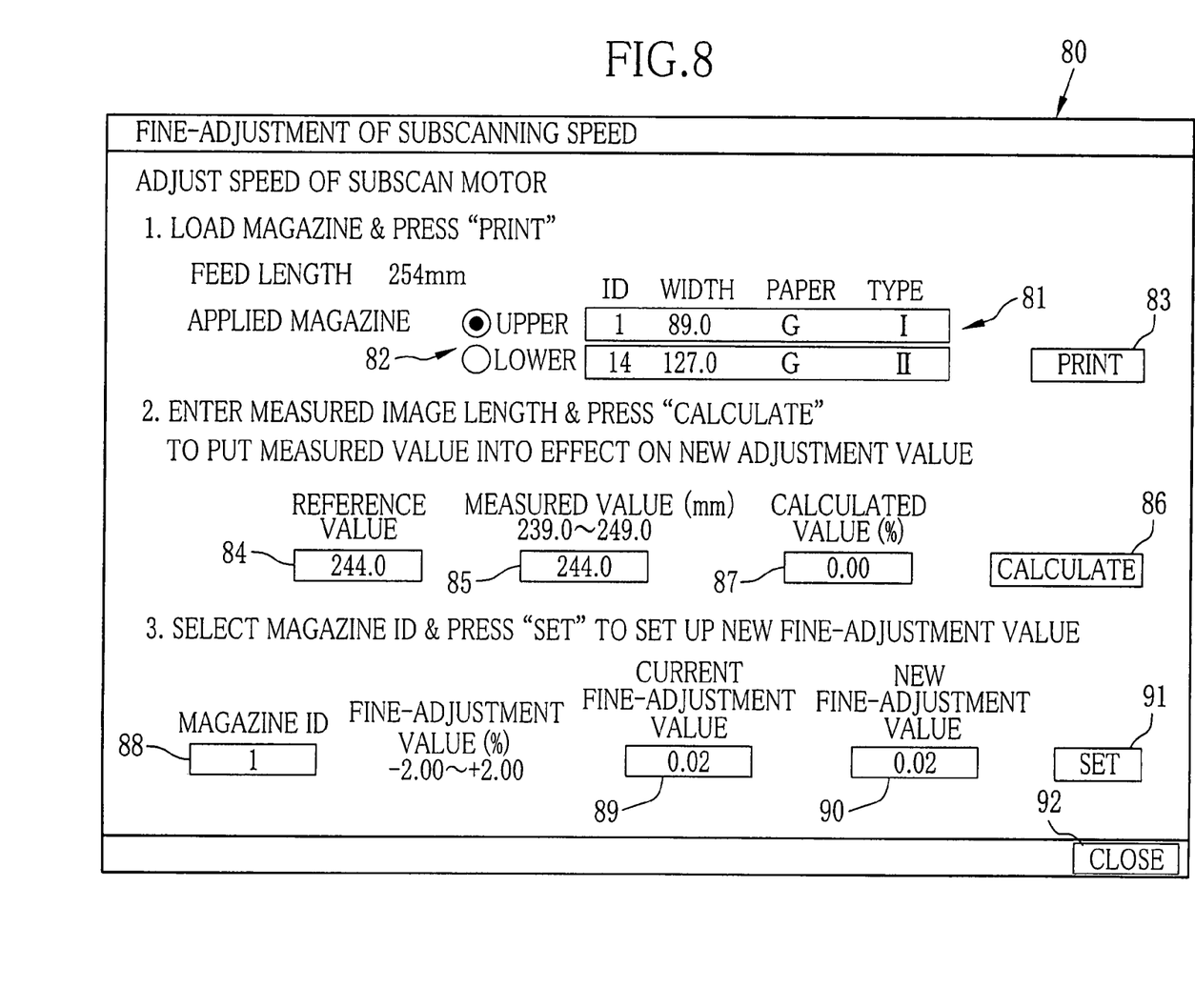
FIG. 8 is an explanatory diagram illustrating a setting screen for fine-adjustment of sub scanning speed.

Moreover, according to the example shown in FIG. 4, the above-mentioned four kinds of parameters: the fine-adjustment value A1, the fine-adjustment value E1, the fine-adjustment values B1 and B2, and the fine-adjustment values C1 and C2, are set on the initial setting screen 50 at the same time for all magazines loaded on the magazine set positions. It is, however, possible to set the four kinds of parameters on each individual magazine. For example, as shown in FIGS. 7 and 8, it is possible to set the respective parameters on individual magazine while displaying on the monitor 17 a setting screen 70 for fine-adjustment of image position and image skew, or a setting screen 80 for fine-adjustment of the sub scanning speed that is a transport speed by a sub scan monitor.

Now the fine-adjustment of image position and image skew on the setting screen 70 will be explained. As the operator operates the console 18 to open the setting screen 70 for fine-adjustment of image position and image skew, the setting screen 70 is displayed on the monitor 17. The operator continues operations following the indications displayed on the fine-adjustment of image position and image skew setting screen 70. The first thing is to select the magazine to apply. After making sure that the magazines 11 and 12 are loaded respectively on the magazine decks 5 and 6, the operator inputs magazine information including the magazine identification number into a magazine information entry field 71. The magazine information entry field 71 includes two entry boxes for upper and lower magazines. The upper entry box corresponds to the magazine 11 loaded on the magazine deck 5 and the lower one to the magazine 12 loaded on the magazine deck 6.

It is alternatively possible to enter the magazine information in the magazine information entry field 71 automatically when the magazines 11 and 12 are loaded on the magazine decks 5 and 6. For this purpose, each magazine is provided with a tag storing the magazine information, and the magazine deck is provided with a tag reader for reading the tag information stored in the tag.

There is a check field 72 for selecting the applied magazine on the left of the magazine information entry field 71. The check field 72 consists of two check boxes corresponding to the upper magazine and the lower one. When to apply the magazine 11 loaded on the magazine deck 5, the upper box is checked by the operator's operation. When to apply the magazine 12 loaded on the magazine deck 6, the lower box is checked.

The operator then inputs a feed length value of the photosensitive material into an entry field 73 and presses a print button 74. When the print button 74 is pressed, the photosensitive material 13 is supplied from a designated magazine, e.g. the magazine 11, and the test print 61 recorded the same test pattern as one in the initial setting is output. At this time, the system controller 19 prints the test print 61 based on the fine-adjustment values stored in the internal memory 20. In this test-printing, the back-printing section 7 also prints information to identify the test print 61.

The operator measures the dimensions of the sections LA, LC, LD and LE in the test print 61 by the measuring device. After inputting the magazine identification number of the magazine to correct its fine-adjustment values into an entry field 75, the operator inputs a calculated value D=5.0 mm−the measured value LD, a calculated value A=5.0 mm−the measured value LA, and a calculated value C=the measured value LC−the measured value LE, and inputs these values into corresponding boxes in a second entry field 76. The second entry field 76 consists of three kinds of data entry columns for each of the upper and lower magazines, wherein the data entry columns are respectively for entering the calculated value E for adjustment in the main scan direction, the calculated value A for adjustment in the sub scan direction, and the calculated value C for correcting the skew.

When a set button 77 is pressed, the calculated values E, A and C, as written in the second entry field 76, are stored in the memory 20. The operator enters these values for 756 different patterns (756=63·2·6), that is, every individual magazine identification number (63 kinds), every magazine position (2 places, upper and lower), and every range of the paper feed length (6 ranges).

When the entered value D (=5.0 mm−the measured value LD) is positive, the system controller 19 controls the exposure section 9 to move the image to record in the main scan direction to make the measured value LD larger, thereby to make the value D close to zero. When the entered value E is negative, the system controller 19 moves the image to record in the main scan direction so as to make the measured value LD smaller and the value D close to zero. The image position is also adjusted in the sub scan direction so as to make the value A (=5.0 mm−the measured value LA) close to zero. In addition, when the entered value C (=the measured value LC−the measured value LE) is positive, the system controller 19 controls the skew correcting section 8 so as to move the recording position of the image so as to make the measured value LE larger and thus make the value C close to zero. On the contrary, when the value C is negative, the measured value LE is made smaller till the value C becomes zero. Thereby, the system controller 19 corrects the skew of the photosensitive material to the main scan direction of the exposure section 9.

Next, the fine-adjustment of sub scanning speed on the setting screen 80 will be explained. As the operator operates the console 18 to select the fine-adjustment of sub scanning speed, the setting screen 80 for fine-adjustment of sub scanning speed is displayed on the monitor 17. The operator also continues operations following the indications displayed on the setting screen 80. In the same way as on the setting screen 70 for fine-adjustment of image position and image skew, the operator makes sure that the magazines 11 and 12 are loaded respectively on the magazine decks 5 and 6, inputs the magazine information including the magazine identification number into a magazine information entry field 81 and checks a check field 82 so as to select the magazine to apply.

Thereafter when the operator presses a print button 83, the test-printing is performed. For this test-printing, the photosensitive material 13 is supplied from the designated magazine, e.g. the magazine 11, and a test print 61 recorded the same test pattern 60 as one in the initial setting is printed out at a feed length of 254 mm. This time, the system controller 19 prints the test print 61 based on the fine-adjustment values stored in the memory 20. In the same way as above-mentioned case, the back-printing section 7 prints the kind of print, the paper feed length, date of printing, the magazine identification number and the magazine position (upper or lower) on the backside of the test print 61.

The operator inputs a reference value of the image length, e.g. 244.0 mm, into a reference value entry field 84 and a measured image length LB, e.g. 244.0 mm, measured from the test print 61 into a measured value entry field 85, and then presses a calculate button 86. As the calculate button 86 is pressed, the system controller 19 displays in a calculated value field 87 the result of calculation: ((LB−244)/244)·100. The operator then enters the magazine identification number into a magazine ID entry field 88. The system controller 19 displays a current fine-adjustment value, e.g. 0.02, in a current fine-adjustment value entry field 89 and then a new fine-adjustment value in a new fine-adjustment value entry field 90, wherein the new fine-adjustment value=current fine-adjustment value−the calculated value. After that, as the operator presses a set button 81, the system controller 19 updates the fine-adjustment value corresponding to the designated magazine identification number and stores the new fine-adjustment value in the memory 20. The fine-adjustment value is updated every magazine identification number (63 kinds).

Next, the overall operation of the printer processor 2 of the present invention will be explained. When the operator operates the console 18 to start printing, the system controller 19 receives a print order from the console 18 and controls every section to start the processing for printing.

Then the photosensitive material, e.g. the photosensitive sheet 13a, starts to be conveyed. When the leading end of the photosensitive sheet 13a reaches the detecting sensor 46, the detecting sensor 46 detects the leading end of the photosensitive sheet 13a. In predetermined seconds after receiving a detection signal from the detecting sensor 46, the system controller 19 starts controlling the skew correcting section 8 to correct the skew of the photosensitive sheet 13a.

In the processing of skew correction, the system controller 19 corrects the skew of the photosensitive material by controlling the tilt of the skew correcting roller pair 43 and of the transport guides 44 and 45 at the skew correcting section 8 based on the respective fine-adjustment values stored in the memory 20. As a result, the photosensitive sheet 13a is conveyed to the exposure section 9 in the state that the leading edge of the photosensitive sheet 13a becomes parallel to the main scan direction of the exposure section 9. The printing process is continued on the photosensitive sheet 13a without the skew correcting roller pair 43 and the transport guides 44 and 45 returning from the tilt position to an original position.

Moreover the system controller 19 controls the exposure section 9 based on the respective fine-adjustment values stored in the memory 20 to record the image on the photosensitive surface of the photosensitive sheet 13a in the form of the latent image by the scanning exposure based on the image data. At this time, because the sub scanning speed and the exposure position are properly controlled, the image of a proper length is recorded in the proper position where there is no deviation in the main and sub scan directions on the photosensitive sheet 13a whose skew has been corrected.

After that, the photosensitive sheet 13a is distributed into plural lines or aligned in a single line at the distribution section 10, and is conveyed to the processor section 4 where the photosensitive sheet 13a goes through such processing as developing and drying, to be output as a photo print.

As mentioned above, the printer processor 2 outputs the test print recorded with the predetermined test pattern, measures the dimensions of the predetermined sections LA to LF of the test pattern on the test print, calculates the correction values to correct the skew of the photosensitive material, the sub scanning speed and the print starting positions in the main and sub scan directions based on the measured values, and controls the skew correcting section 8 and the exposure section 9 based on the correction values that correct any errors including the tolerances the skew correcting section 8 and the exposure section 9 have themselves as units. For this reason, it is possible to accurately correct the skew of the photosensitive material, the deviation of image position in the main and sub scan directions and the image length in the sub scan direction. Consequently, photo prints does not suffer any image skew, variation in the image length in the sub scan direction, or deviation of image position in the main and sub scan directions.

In addition, since the test pattern on the test print consists of plural lines which are parallel to the main scan direction or the sub scan direction, the sections to measure are distinct. Moreover, since it is easy to measure the dimensions of these sections, and the measured lengths can be unified, it is possible to apply the same measuring device for measuring the test pattern, and save the number of steps for the measurement.

Although the present embodiment relates to a printer processor that is provided with two magazine decks as the magazine set positions, the number of magazine decks is not limited to two, but may be just one or more than two. The present invention is applicable to a printer processor where a plural number of magazines of recording materials of the same width are loaded, though the above-described embodiment can be loaded with two kinds of magazines of different widths of recording materials.

The test pattern to be recorded on the test prints is not limited to the illustrated one that consists of framing lines parallel to the main and sub scan directions, but any other test pattern is usable insofar as it permits measuring dimensions which serve as parameters necessary for correcting skew of the recording material, image recording position and print starting positions. However, such a test pattern that consists of framing lines parallel to the main and sub scan directions is preferable because it is easy to measure and enables unifying the measured lengths, which permits using the same measuring device for measuring a plural kinds of test prints, and thus saves the number of processing steps.

In the above embodiment, the operator measures the test pattern on the test print by use of a separate measuring device. However, it is possible to incorporate a measuring device for the test print into the printer processor, e.g. in the sorter section, so that the measuring device automatically measures the necessary sections of the test pattern on the test print. Such an internal measuring device may be comprised of an imaging device like a CCD, so the dimensions of the respective sections to measure are detected from image data captured by the imaging device. In this case, the measured values may automatically be displayed and entered on the respective setting screens. Although the present invention has been described with respect to the printer processor whose photographic printer section is the image recording apparatus to which the present invention is applied, the present invention is of course applicable to other types of image recording apparatuses, such as thermal printers, ink-jet printers and laser printers.

Thus, the present invention is not to be limited to the above embodiments but, on the contrary, various modifications will be possible without departing from the scope of claims appended hereto.

What is claimed is:

1. A method of adjusting an image recording apparatus that comprises a recording material supply section for supplying sheets of recording material, a conveyer device for conveying the recording material along a transport path, a recording device for recording an image on the recording material as being conveyed, and a skew correction device for correcting skew of the recording material on said transport path so as to make a leading edge of each sheet of the recording material be parallel to a main scan direction that is a widthwise direction of said transport path, said method comprising steps of:

supplying first and second sheets of recording material from said recording material supplying section, said first and second sheets being different in length in a sub scan direction that is a lengthwise direction of said transport path;

recording a test pattern on said first and second sheets of recording material by said recording device, to produce first and second test prints, said test pattern having a first line that is defined to be parallel to said sub scan direction;

measuring distances from one side of each of said test prints to two different points of said first line as recorded on each of said test prints;

calculating a skew degree of each of said first and second test prints from said measured two distances;

calculating skew characteristics of each of said first and second sheets of recording material from said skew degrees of said first and second test prints, said skew characteristics being dependent upon a location of said recording material supply section and the lengths in the sub scan direction of said first and second sheets; and adjusting, based on the calculated skew characteristics, correction parameters for said skew correction device to correct skew of recording materials supplied from said recording material supply section;

wherein said test pattern comprises a plural number of second lines defined to be parallel to the main scan direction, and a third line that is symmetrical to said first line about a referential line connecting center points of said second lines to each other, and said method further comprises steps of:

calculating a variation of a print starting position in the main scan direction based on a difference between a distance from the one side edge to said first line and a distance from opposite side edge to said third line with respect to either of said test prints; and adjusting the print starting position in the main scan direction by controlling said recording device based on the calculated variation of the print starting position in the main scan direction.

2. A method of adjusting an image recording apparatus as claimed in claim 1, wherein said image recording apparatus comprises a second recording material supply section, and said method further comprises steps of:

supplying a third sheet of recording material from said second recording material supplying section, said third sheet being equal in length in the sub scan direction to said first sheet;

recording a test pattern on said third sheet, to produce a third test print;

measuring distances from one side of said third test print to two different points of said first line as recorded on said third test print;

calculating a skew degree of said third test print from said measured two distances;

calculating skew characteristics of said third sheet of recording material from said skew degrees of said first and third test prints, said skew characteristics being dependent upon a location of said second recording material supply section and the length in the sub scan direction of said third sheet; and adjusting, based on the calculated skew characteristics of said third sheet, correction parameters for said skew correction device to correct skew of recording materials as supplied from said second recording material supply section.

3. A method of adjusting an image recording apparatus as claimed in claim 1, wherein said test pattern comprises a second line that is defined to be parallel to said main scan direction, and said method further comprises steps of:

calculating a variation of a print starting position in the sub scan direction based on a distance from a leading end to said second line of either of said test prints; and adjusting the print starting position in the sub scan direction by controlling said recording device based on the calculated variation of the print starting position in the sub scan direction.

4. A method of adjusting an image recording apparatus as claimed in claim 3, wherein said recording material supply section is loaded with one of different kinds of exchangeable recording material containers, and a test print is made to adjust the correction parameters for said skew correction device and the print starting position in the sub scan direction with respect to each of said recording material containers.

5. A method of adjusting an image recording apparatus as claimed in claim 1, wherein said recording material supply section is loaded with one of different kinds of exchangeable recording material containers, and a test print is made to adjust the correction parameters for said skew correction device and the print starting position in the main scan direction with respect to each of said recording material containers.

6. A method of adjusting an image recording apparatus as claimed in claim 1, wherein said test pattern comprises at least two second lines defined to be parallel to the main scan direction and spaced apart from each other at a predetermined distance, and said method further comprises steps of measuring a distance between said second lines on either of said test prints to calculate a fluctuation in transport speed of the recording material, and controlling said conveyer device to adjust the transport speed based on the calculated fluctuation in transport speed.

7. A method of adjusting an image recording apparatus as claimed in claim 6, wherein said recording material supply section is loaded with one of different kinds of exchangeable recording material containers, and said method further comprises steps of making a test print on each of recording materials of different widths supplied from different ones of said recording material containers, calculating fluctuation characteristics of the transport speed to the width or length in the main scan direction of each of said recording materials, to adjust the transport speed with respect to each of said recording material containers.

8. A method of adjusting an image recording apparatus as claimed in claim 1, further comprising a step of providing information identifying said test prints on a front side or a back side of each of said test prints.

9. A method of adjusting an image recording apparatus that comprises a recording material supply section for supplying sheets of recording material, a conveyer device for conveying the recording material along a transport path, a recording device for recording an image on the recording material as being conveyed, and a skew correction device for correcting skew of the recording material on said transport path so as to make a leading edge of each sheet of the recording material be parallel to a main scan direction that is a widthwise direction of said transport path, said method comprising steps of:
  supplying first and second sheets of recording material from said recording material supplying section, said first and second sheets being different in length in a sub scan direction that is a lengthwise direction of said transport path;
  recording a test pattern on said first and second sheets of recording material by said recording device, to produce first and second test prints, said test pattern having a first line that is defined to be parallel to said sub scan direction;
  measuring distances from one side of each of said test prints to two different points of said first line as recorded on each of said test prints;
  calculating a skew degree of each of said first and second test prints from said measured two distances;
  calculating skew characteristics of each of said first and second sheets of recording material from said skew degrees of said first and second test prints, said skew characteristics being dependent upon a location of said recording material supply section and the lengths in the sub scan direction of said first and second sheets; and
  adjusting, based on the calculated skew characteristics, correction parameters for said skew correction device to correct skew of recording materials supplied from said recording material supply section
  wherein said image recording apparatus comprises a second recording material supply section, said test pattern comprises a second line that is defined to be parallel to said main scan direction, a plural number of second lines defined to be parallel to the main scan direction, and a third line that is symmetrical to said first line about a referential line connecting center points of said second lines to each other, and said method further comprises steps of:
  supplying a third sheet of recording material from said second recording material supplying section, said third sheet being equal in length in the sub scan direction to said first sheet;
  recording a test pattern on said third sheet, to produce a third test print;
  measuring distances from one side of said third test print to two different points of said first line as recorded on said third test print;
  calculating a skew degree of said third test print from said measured two distances;
  calculating skew characteristics of said third sheet of recording material from said skew degrees of said first and third test prints, said skew characteristics being dependent upon a location of said second recording material supply section and the length in the sub scan direction of said third sheet;
  adjusting, based on the calculated skew characteristics of said third sheet, correction parameters for said skew correction device to correct skew of recording materials as supplied from said second recording material supply section;
  calculating a variation of a print starting position in the sub scan direction based on a distance from a leading end to said second line of either of said test prints;
  calculating a variation of a print starting position in the main scan direction based on a difference between a distance from the one side edge to said first line and a distance from opposite side edge to said third line with respect to each of said first and third test prints;
  adjusting the print starting positions in the main and sub scan directions by controlling said recording device based on the calculated variations of the print starting positions in the main and sub scan directions.

10. A method of adjusting an image recording apparatus as claimed in claim 9, wherein said first and third sheets of recording material have different widths, and said method further comprises steps of measuring a distance between said second lines on either of said test prints to calculate a fluctuation in transport speed of the recording material, and calculating fluctuation characteristics of the transport speed to the width or length in the main scan direction of each of said recording materials, to adjust the transport speed with respect to each of said recording material containers controlling said conveyer device to adjust the transport speed based on the calculated transport speed.

11. A method of adjusting an image recording apparatus as claimed in claim 10, wherein said recording material supply section is loaded with one of different kinds of exchangeable recording material containers, and said method further comprises steps of making a test print with respect to each of said recording material containers, to adjust the correction parameters for said skew correction device, the print starting positions in the main and sub scan directions and the transport speed of said conveyer device individually on each of said recording material containers.

12. A method of adjusting an image recording apparatus as claimed in claim 11, wherein said image recording apparatus comprises a display device, and said method comprises steps of displaying a selected one of setting screens on said display device, said setting screens comprising one for allowing adjusting the correction parameters for said skew correction device, the transport speed of said conveyer device and the print starting positions in the main and sub scan directions simultaneously with respect to all of said recording material containers, and ones for allowing adjusting any of the correction parameters for said skew correction device, the transport speed of said conveyer device, the print starting position in the main scan direction or the print starting position in the sub scan direction with respect to individual one of said recording material containers.

* * * * *